US007555868B2

(12) United States Patent
Tenorio et al.

(10) Patent No.: US 7,555,868 B2
(45) Date of Patent: Jul. 7, 2009

(54) WINDOW REGULATOR LIFTER PLATE

(75) Inventors: Aaron C. Tenorio, Commerce TWP, MI (US); Oscar A. Hernandez, Col. del Carmen (MX); Mahiuddin Ahmed, Troy, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 457 days.

(21) Appl. No.: 11/474,389

(22) Filed: Jun. 26, 2006

(65) Prior Publication Data

US 2007/0294951 A1 Dec. 27, 2007

(51) Int. Cl.
*B60J 1/16* (2006.01)

(52) U.S. Cl. .......................................... 49/375; 49/374

(58) Field of Classification Search .................. 49/372, 49/374, 375, 352
See application file for complete search history.

(56) References Cited

U.S. PATENT DOCUMENTS

| | | | | |
|---|---|---|---|---|
| 3,736,702 A * | 6/1973 | Pickles | ........................ | 49/362 |
| 4,183,178 A * | 1/1980 | Kiefer et al. | .................. | 49/375 |
| 6,170,197 B1 * | 1/2001 | Tyves et al. | .................. | 49/375 |
| 6,729,073 B2 | 5/2004 | Nicolai | | |

FOREIGN PATENT DOCUMENTS

| | | | |
|---|---|---|---|
| DE | 3545856 C1 * | 1/1987 |
| DE | 3935629 A1 * | 5/1991 |
| FR | 2649749 A1 * | 1/1991 |
| JP | 02213578 A * | 8/1990 |

* cited by examiner

*Primary Examiner*—Jerry Redman
(74) *Attorney, Agent, or Firm*—Global IP Counselors, LLP

(57) ABSTRACT

A vehicle door includes a door body, a window panel, a window regulator rail and a lifter plate. The door body defines a window opening and a window panel is slidably supported in the door body. The window regulator rail is mounted to the vehicle frame and the lifter plate is slidably coupled to the window regulator rail for up and down sliding movement along the window regulator rail. The lifter plate includes a window glass support portion supporting a lower edge of a window panel and a water deflecting structure that is configured and arranged to deflect water running down the window panel away from the window regulator rail.

18 Claims, 6 Drawing Sheets

WINDOW REGULATOR LIFTER PLATE

BACKGROUND OF THE INVENTION

1. Field of the Invention

The present invention generally relates to a window regulator lifter plate for a vehicle. More specifically, the present invention relates to a window regulator lifter plate for a vehicle window regulator mechanism of a vehicle in which the window regulator lifter plate has a water diverting feature to divert water from the vehicle window regulator mechanism.

2. Background Information

Vehicles are continually being redesigned and improved for functionality and improved longevity. One area of continuing redesign concerns reducing the infiltration of water and moisture into various devices and mechanism within vehicles in order to prevent the onset of rust or corrosion. A specific area of concern includes preventing water from infiltrating components of a vehicle window regulator mechanism.

Vehicle doors typically include at least one window regulator mechanism for raising and lowering (opening and closing) window glass panel disposed between parallel tracks within the vehicle door. Such window regulator mechanisms typically include a lifter plate, a supporting rail and a power mechanism. The lifter plate typically supports and is coupled to a lower edge of the window glass panel. The lifter plate is further configured to slide up and down along the rail moved by a cable, chain or other similar power transmitting element that is in turn moved by the power mechanism. The power mechanism can be a manually operated crank mechanism or an electric motor with a pulley that engages the cable or chain. Due to the stresses placed upon the rail, the rail is preferably made of rigid material such as metal, which can corrode after repeated exposure to water and moisture.

An outer portion of the vehicle door is usually provided with a rubber seal that presses against the window glass in order to prevent water from infiltrating the interior of the door and the window regulator mechanism. However, such rubber seals cannot prevent all water from infiltrating the vehicle door, in particular when the window is left partially open in the rain. Consequently, water and moisture can reach the window regular mechanism and drip onto the lifter plate. Water dripping on the lifter plate can then make its way to the rail. Eventually, the rail can begin to corrode thereby affecting the operation of the window regulator mechanism and shortening its operational life.

In view of the above, it will be apparent to those skilled in the art from this disclosure that there exists a need for an improved window regulator mechanism that deflects water away from the rail. This invention addresses this need in the art as well as other needs, which will become apparent to those skilled in the art from this disclosure.

SUMMARY OF THE INVENTION

One object of the present invention is to provide a window regulator lifter plate with a water diverting feature to prevent water from running on to the rail of a window regulator mechanism.

Another object of the present invention is to provide a window regulator lifter plate that prolongs the operational life of the rail of a window regulator mechanism.

In accordance with one aspect of the present invention, a vehicle door includes a door body, a window panel, a window regulator rail and a lifter plate. The door body defines a window opening and the window panel is slidably supported in the door body. The window regulator rail is mounted to the door frame and the lifter plate is slidably coupled to the window regulator rail for up and down sliding movement along the window regulator rail. The lifter plate includes a window glass support portion supporting a lower edge of a window panel and a water deflecting structure that is configured and arranged to deflect water running down the window panel away from the window regulator rail.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
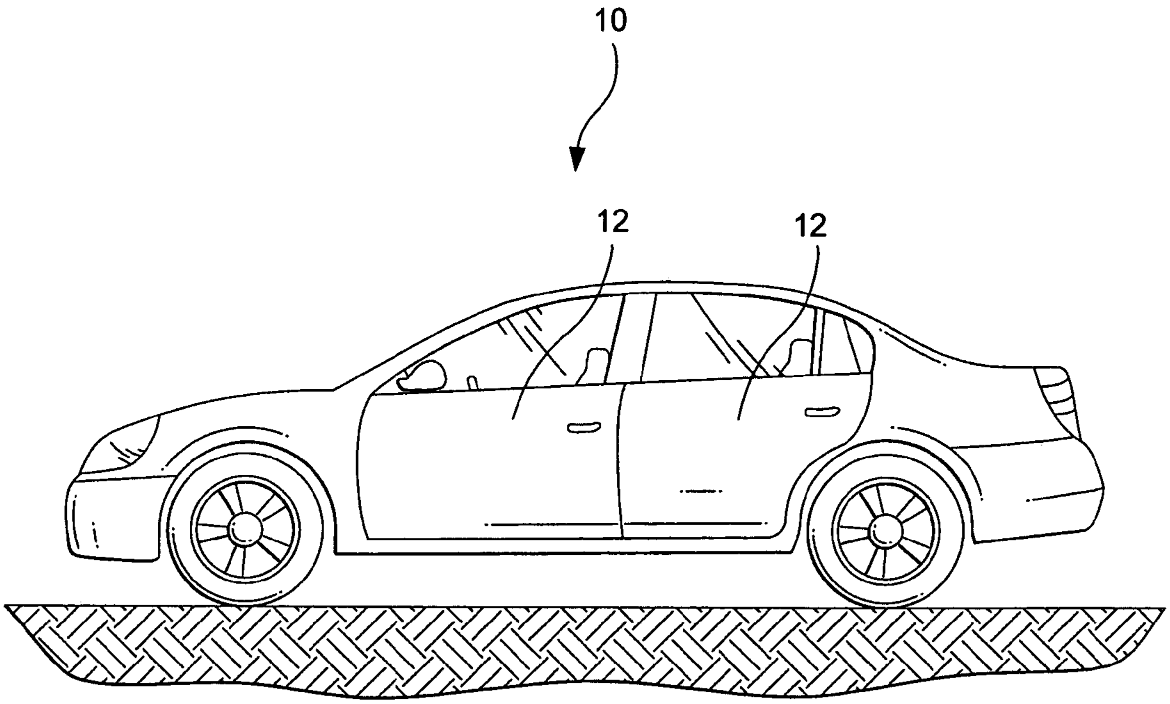
FIG. 1 is a side elevational view of a vehicle that includes window regulator mechanisms within vehicle doors in accordance with one embodiment the present invention.
Figure 2:
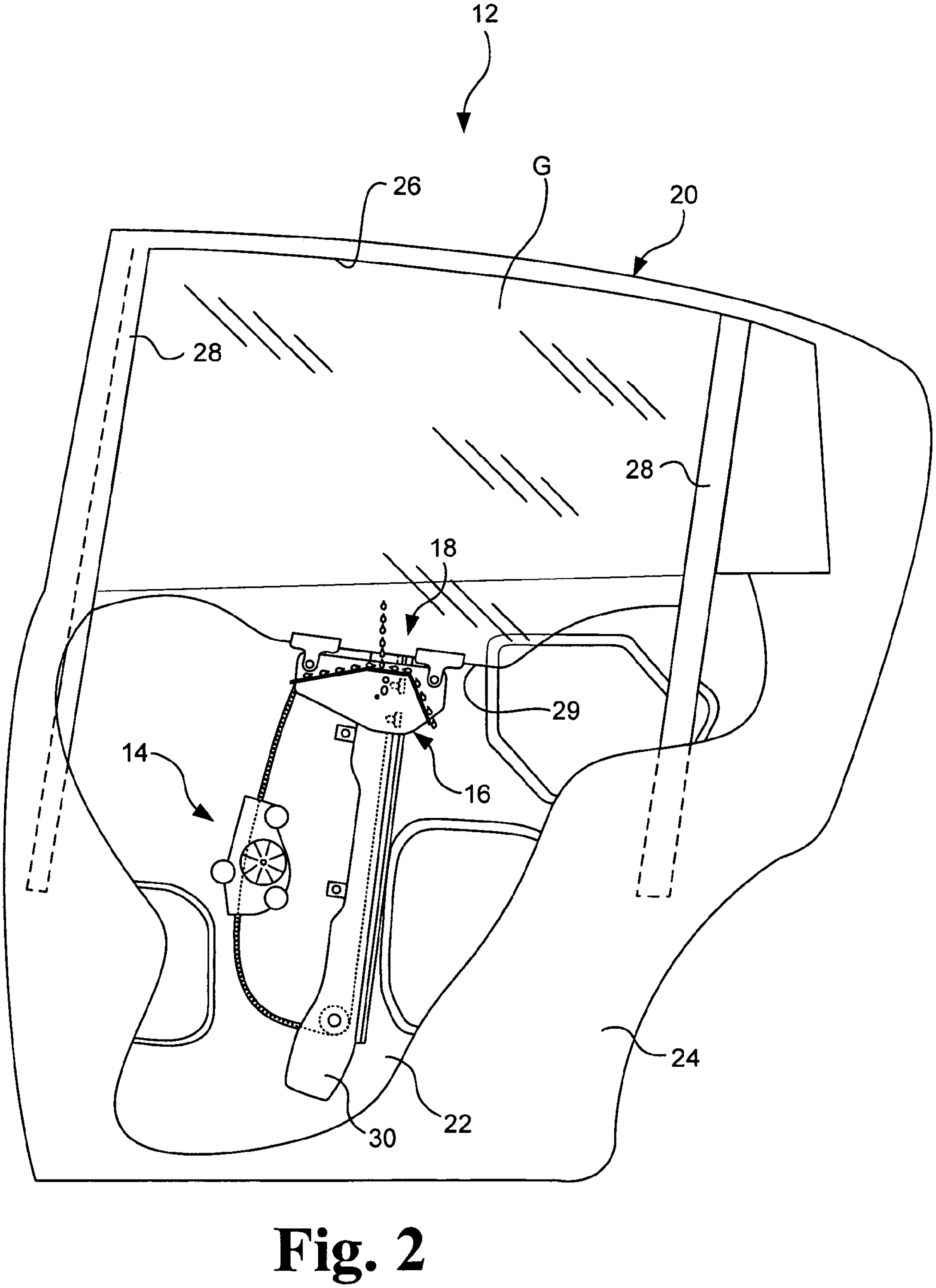
FIG. 2 is side elevational view of one of the vehicle doors of the vehicle depicted in FIG. 1, with a cut-away in the vehicle door revealing a portion of a window regulator mechanism in accordance with one embodiment the present invention.

Referring initially to FIG. 1, a vehicle 10 is illustrated that is equipped in accordance with one embodiment of the present invention. The vehicle 10 includes a plurality of vehicle doors 12. One of the doors 12 is shown removed from the vehicle 10 in FIG. 2 to provide greater clarity. As shown in FIG. 2, each of the vehicle doors 12 includes a window regulator mechanism 14 with a lifter plate 16 that includes a water deflecting structure 18. The water deflecting structure 18 is configured to divert water away from various portions of the window regulator mechanism 14 in order to reduce potential degradation typically associated with water infiltration, such as corrosion of metallic parts, as described in greater detail below.

Figure 5:
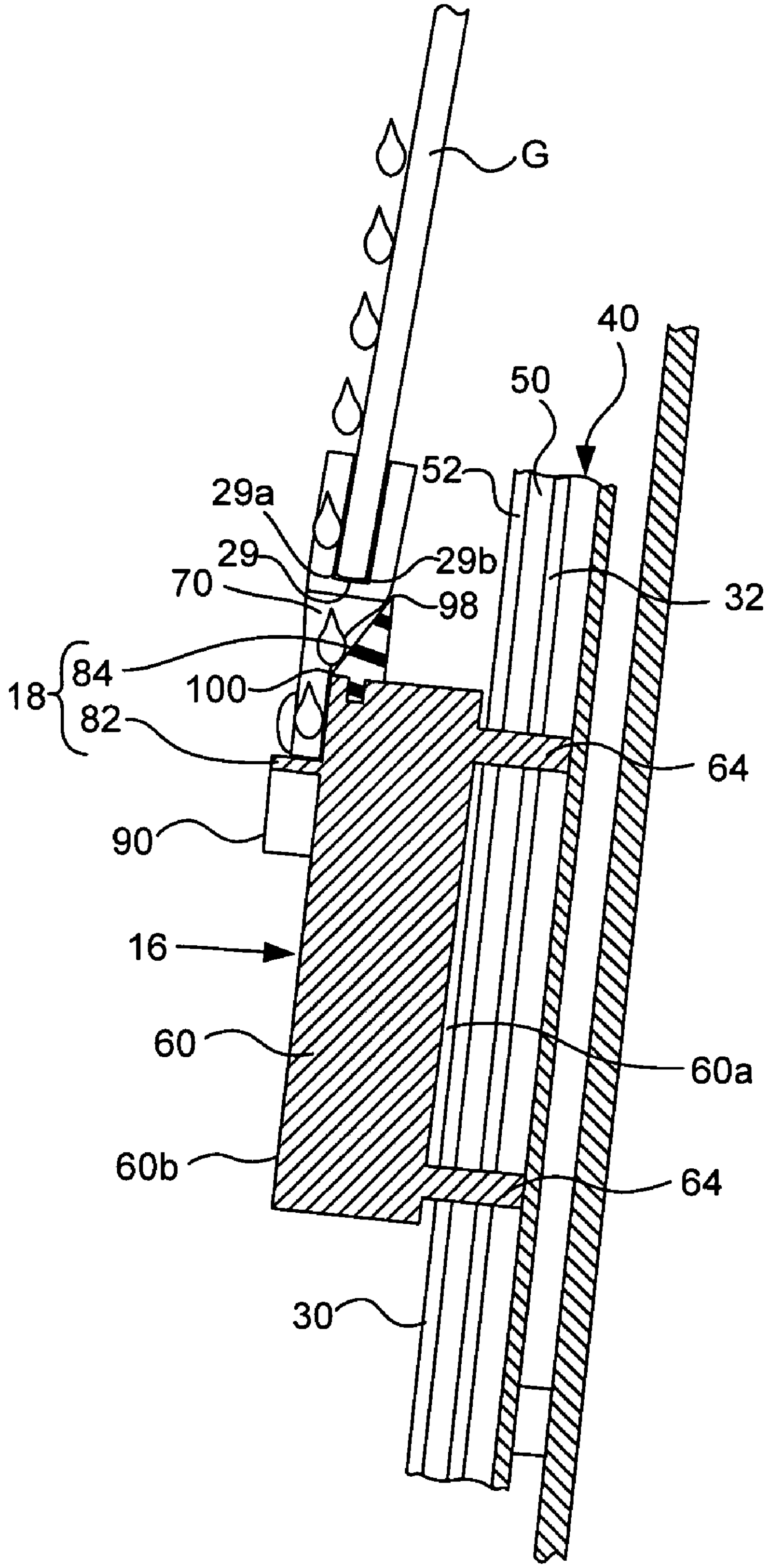
FIG. 5 is a cross-sectional view of the portion of the window regulator mechanism taken along section line 5-5 in FIG. 4 showing details of the lifter plate, the rail and a cable of the window regulator mechanism in accordance with one embodiment the present invention.

As shown in FIG. 2, the vehicle door 12 basically includes, among other things, a door body 20 generally formed by an inner support panel 22 and an outer panel 24. A window opening 26 is formed by an upper frame of the door body 20. The vehicle door 12 also has a pair of parallel window tracks 28 mounted to the door body 20. In FIG. 2, a portion of the outer panel 24 has been cutaway to reveal the inner support panel 22, the window regulator mechanism 14 and portions of the window tracks 28. The two window tracks 28 are installed on opposite sides of the window opening 26. A window panel G that is preferably made of safety glass is installed in the door body 20 between the window tracks 28 for up and down sliding movement along the tracks 28. Movement of the window panel G is controlled by the window regulator mechanism 14, as described in greater detail below. The window panel G has a lower edge 29 that includes lower outer edge 29*a* (FIG. 5) and a lower inner edge 29*b* (FIG. 5).

Figure 3:
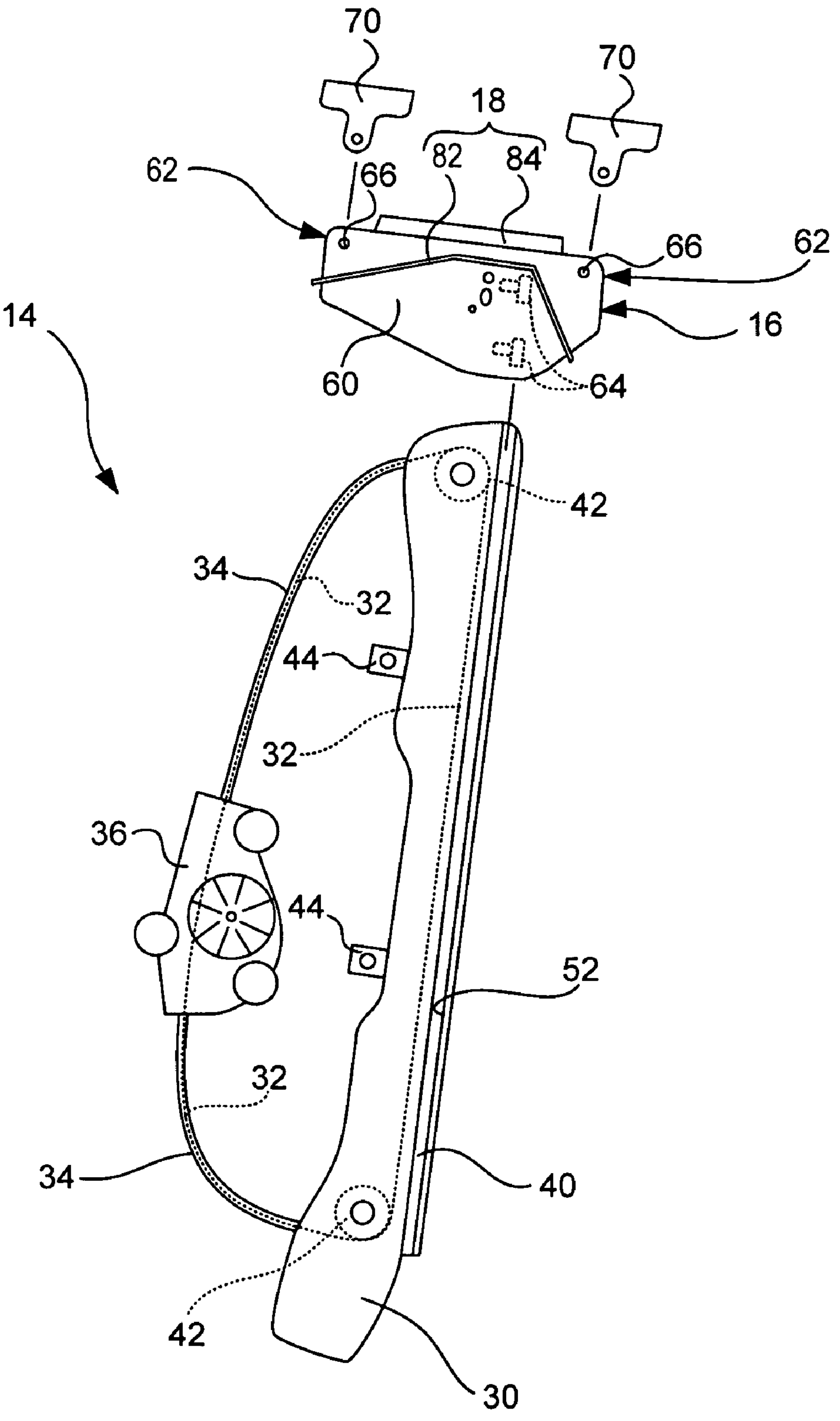
FIG. 3 is an exploded perspective view showing elements of the window regulator mechanism removed from the vehicle door in accordance with one embodiment the present invention.

As shown in FIGS. 2 and 3, the window regulator mechanism 14 basically includes a window regulator rail 30, a cable 32, a pair of Bowden type cable tubes 34, a power mechanism 36, and the lifter plate 16. Other than the construction of the lifter plate 16, as discussed below, the window regulator mechanism 14 is a relatively conventional mechanism that is well known in the art. Thus, the window regulator mechanism 14 will only be briefly discussed and illustrated to explain the present invention.

The window regulator rail 30 resembles a hollow tube that has an elongated a channel 40, a pair of pulleys 42 and a pair mounting brackets 44. As shown more clearly in FIGS. 4, 5 and 6, the channel 40 has a hollow interior 50 and an elongated opening or slit 52. As shown in FIG. 3, the pulleys 42 are spaced apart from one another with one of the pulleys 42 being installed at the top of the window regulator rail 30 within the channel 40, and the other of the pulleys 42 being installed at the bottom of the window regulator rail 30 within the channel 40.

The mounting brackets 44 are configured for mounting the window regulator rail 30 to the inner support panel 22 of the vehicle door 12. The mounting brackets 44 (and the window regulator rail 30) are preferably mounted to the inner support panel 22 using fasteners, such as bolts or rivets. However, it should be understood from the drawings and the description herein the window regulator rail 30 can be mounted directly to a portion of the vehicle frame, for instance when the vehicle is a two door coupe with a back seat that includes windows adjacent to a back seat.

As shown in FIG. 3, the cable 32 extends through the channel 40, around each of the pulleys 42, through the Bowden type cable tubes 34 and through the power mechanism 36. The Bowden type cable tubes 34 extend from respective ones of a top and bottom portion of the window regulator rail 30 adjacent to respective ones of the pulleys 42 and to the power mechanism 36.

The power mechanism 36 is a conventional mechanism that can be either an electric motor (power windows) or a hand crank mechanism that is configured in a conventional manner to transmit rotary power to the cable 32. The cable 32 is connected to the lifter plate 16, as described in greater detail below. Hence, movement of the cable 32 causes the lifter plate 16 to move along the channel 40 of the window regulator rail 30 thereby raising or lowering the window panel G along the window tracks 28 in and out of the window opening 26.

As best shown in FIGS. 3 to 6, the lifter plate 16 basically includes a main body 60, a pair of window glass support portions 62 and a window regulator engagement portion 64. The water deflecting structure 18 is integrally formed with the main body 60 of the lifter plate 16. The parts of the lifter plate 16 can be made of any of a variety of materials such as metal, plastic or polymer materials as needed and/or desired.

Figure 4:
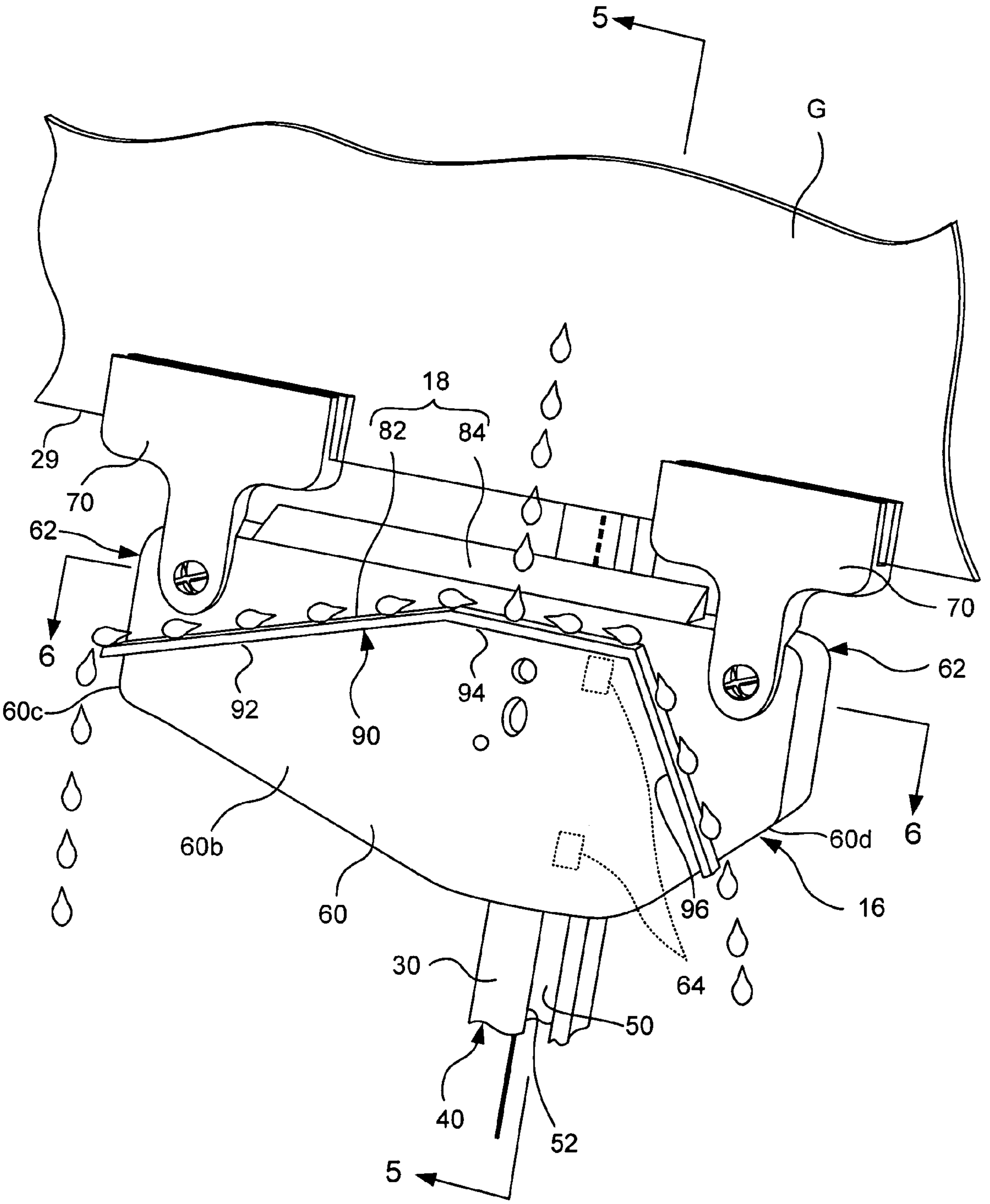
FIG. 4 is a side perspective view of a portion of the window regulator mechanism depicted in FIGS. 2 and 3 showing a lifter plate and a portion of a rail in accordance with one embodiment the present invention.

Still referring to FIGS. 3 to 6, the main body 60 includes an inboard surface 60*a*, an outboard surface 60*b*, a front edge 60*c* (FIG. 4) and a rear edge 60*d* (FIG. 4). The main body 60 is preferably a one-piece, unitary member that is formed as a molded plastic member. The window glass support portions 62 are configured to support the lower edge 29 of the window panel G. Each of the window glass support portions 62 basically includes a mounting aperture 66 (shown in FIG. 3 only) that is formed in the main body 60 and a window panel attachment member 70. The window panel attachment members 70 are configured and arranged to engage the lower edge 29 of the window panel G at a pair of spaced apart locations. As best shown in FIGS. 4 and 5, the window panel attachment members 70 are each formed with grooves that receive the lower edge 29 of the window panel G in a conventional manner. Although not shown, the window panel attachment members 70 can include a clamping device for firmly engaging the window panel G and/or a rubber-like friction insert placed within the groove to retain the window panel G. Fasteners extend through apertures formed in the window panel attachment members 70 and further through the apertures 66 in the window glass support portion 62 of the lifter plate 16 to secure the window panel attachment members 70.

Figure 6:
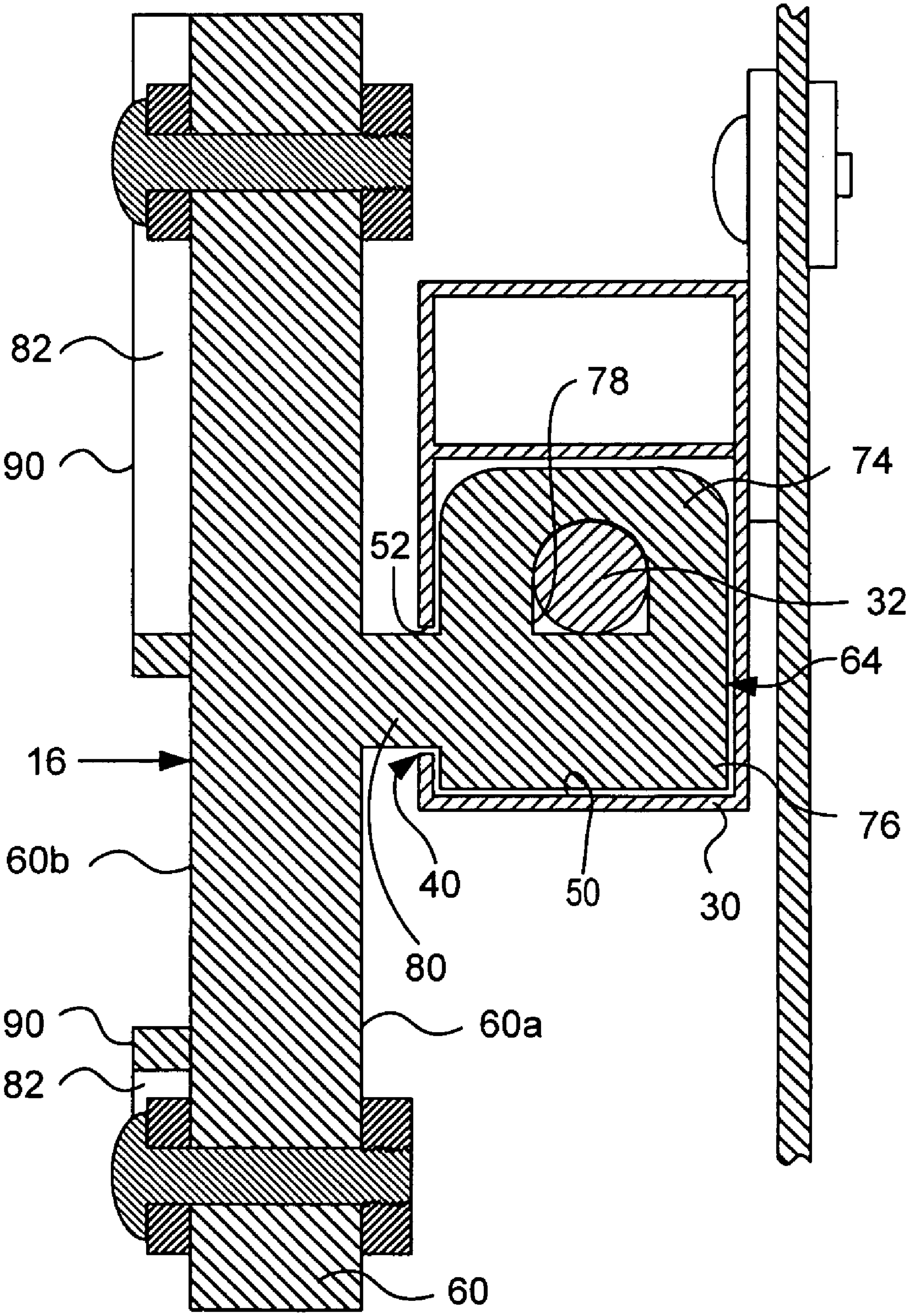
FIG. 6 is a cross-sectional view portion of the window regulator mechanism taken along section line 6-6 in FIG. 4 showing details of the lifter plate, the rail and a cable of the window regulator mechanism in accordance with one embodiment the present invention.

As best shown in FIGS. 5 and 6, the window regulator engagement portions 64 are basically projections extending from the inboard surface 60*a* of the main body 60 of the lifter plate 16. The window regulator engagement portions 64 are configured to be slidably mounted within the hollow interior 50 of the channel 40 such that the lifter plate 16 can slid along the window regulator rail 30 of the window regulator mechanism 14.

It should be understood from the drawings and the description herein that the window regulator engagement portions 64 can be formed integrally with the lifter plate 16 or, alternatively, can be separate elements that are attached to the lifter plate 16 by fasteners, adhesive materials, or welding, depending upon the material used to make the lifter plate 16.

As best shown in FIGS. 5 and 6, the window regulator engagement portions 64 basically include a first lateral extension 74, a second lateral extension 76, a cable clamping portion 78 and a slit extension 80. Since the window regulator engagement portions 64 are generally the same, description of only one is provided for the sake of brevity, but applies to both.

As best shown in FIG. 6, the first lateral extension 74 and the second lateral extension 76 are dimensioned to slide smoothly within the hollow interior 50 of the channel 40 of the window regulator rail 30. The cable clamping portion 78 is shown as an aperture formed within the first lateral extension 74, but can be formed in any of a variety of ways. Specifically, the first lateral extension 74 can be a separate element that is attached to the window regulator engagement portion 64 by fasteners (not shown) thereby clamping the cable 32 in position relative to the main body 60 of the lifter plate 16. The slit extension 80 is basically a narrowed portion of the window regulator engagement portion 64 that extends to the main body 60 through the elongated opening or slit 52.

The window regulator engagement portions 64 are preferably coated with a friction reducing material or lubricant, such that the window regulator engagement portions 64 slide easily and relatively friction free within the hollow interior 50 of the channel 40 of the window regulator rail 30.

Referring to FIGS. 4 and 5, a description of the water deflecting structure 18 is now provided. The water deflecting structure 18 is configured and arranged to deflect water running down the window panel G away from the window regulator rail 30. The water deflecting structure 18 basically includes a first water deflecting surface 82 and a second water deflecting surface 84. The first and second water deflecting surfaces 82 and 84 are integrally formed with the main body 60 as a one-piece, unitary member.

The first water deflecting surface 82 is defined on an outwardly extending ridge 90 that extends from the outboard surface 60*b* of the main body 60 of the lifter plate 16. The first water deflecting surface 82 further extends in a direction that is transverse to movement of the window regulator engagement portion 64 of the main body 60 along the window regulator rail 30. The outwardly extending ridge 90 is an elongated protrusion extending from the outboard surface 60*b* of the lifter plate 16. Consequently, the first water deflecting surface 82 together with adjacent portions of the outboard surface 60*b* of the lifter plate 16 defines a gutter that diverts water from the water deflecting surface 82 toward at least one of the front edge 60*c* and the rear edge 60*d* of the lifter plate 16.

The first water deflecting surface 82 extends in a forward to aft direction and is consequently further configured and arranged to divert water to at least one side of the window regulator rail 30 in the forward to aft direction. The outwardly extending ridge 90 has three portions, a forward inclined portion 92, a central portion 94 and a rearward inclined portion 96. The central portion 94 extends in a direction that is approximately parallel to the length of the window regulator rail 30, the forward inclined portion 92 is inclined downward away from the window regulator rail 30 and the central portion 94 toward the front edge 60*c* (FIG. 4), and the rearward inclined portion 96 is inclined rearward away from the window regulator rail 30 and the central portion 94 toward the rear edge 60*d*. As can be seen in FIG. 4, the first water deflecting surface 82 extends in a forward to aft direction from proximate the first of the two window panel attachment members 70 to proximate the second of the two window panel attachment members 70.

The first water deflecting surface 82 has a convex shape configured to divert water in directions extending away from the window regulator engagement portion 64. Consequently, the first water deflecting surface 82 is configured and arranged to divert water to opposite sides of the window regulator rail 30 in the forward to aft direction and configured to deflect water toward at least one of the front edge 60*c* of the lifter plate 16 and the rear edge 60*d* of the lifter plate 16. It should be understood from the drawings and the description herein that the forward inclined portion 92, the central portion 94 and the rearward inclined portion 96 can also alternatively be formed as a continuous curved projection shaped to divert water away from the window regulator rail 30.

As indicated in FIG. 5, the second water deflecting surface 84 is configured to deflect water running down the window panel G toward the outboard surface 60*b* of the lifter plate 16. The second water deflecting surface 84 is further configured to deflect water running down the window panel G toward the first water deflecting surface 82. The second water deflecting surface 84 has an upper end 98 (see FIG. 5) that is disposed inboard of the lower inner edge 29*b* of the window panel G and a lower end 100 disposed approximately outboard of the lower outer edge 29*a* of the window panel G. The second water deflecting surface 84 is disposed between the first and second window panel attachment members 70 and above the first water deflecting surface 82. As such, the second water deflecting surface 84 is configured to deflect water running down the window panel G toward the first water deflecting surface 82. The second water deflecting surface 84 is also inclined such that it slopes downwardly in a direction towards the first water deflecting surface 82.

It should be understood from the drawings and description herein that the second water deflecting surface 84 can be formed as an inclined surface on a separate element that is secured to the lifter plate 16, or alternatively, the second water deflecting surface 84 can be integrally formed with the lifter plate 16 as a single element or member.

The various portions of the door 12 and vehicle 10 are conventional components that are well known in the art. Since vehicle and door portions are well known in the art, these structures will not be discussed or illustrated in detail herein.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A vehicle window regulator lifter plate comprising:

a window regulator engagement portion configured to be slidably mounted along a window regulator rail of a window regulator mechanism;

a window glass support portion configured to support a lower edge of a window panel having at least one outboard surface and an edge surface that surrounds the outboard surface; and a water deflecting structure protruding outward from the outboard surface of the window glass support portion, the water deflecting structure being configured and arranged relative to the window glass supporting portion to deflect water running down the window panel away from the window regulator rail.

2. The vehicle window regulator lifter plate as set forth in claim 1, wherein the water deflecting structure extends in a forward to aft direction and is further configured and arranged to divert water to at least one side of the window regulator rail in the forward to aft direction.

3. The vehicle window regulator lifter plate as set forth in claim 1, wherein the water deflecting structure extends in a forward to aft direction and is further configured and arranged to divert water to opposite sides of the window regulator rail in the forward to aft direction.

4. The vehicle window regulator lifter plate as set forth in claim 1, wherein the window glass support portion includes first and second window panel attachment members that are configured and arranged to engage the window panel at a pair of spaced apart locations, and the water deflecting structure includes a first water deflecting surface that extends in a forward to aft direction from proximate the first window panel attachment member to proximate the second window panel attachment member.

5. The vehicle window regulator lifter plate as set forth in claim 4, wherein the first water deflecting surface has a convex shape configured to divert water in directions extending away from the window regulator engagement portion.

6. The vehicle window regulator lifter plate as set forth in claim 1, wherein the water deflecting structure includes a first water deflecting surface that extends in a forward to aft direction that is transverse to movement of the window regulator rail along the window regulator engagement portion.

7. The vehicle window regulator lifter plate as set forth in claim 1, wherein the water deflecting structure includes an elongated protrusion that extends outward from the outboard surface of the window glass support portion and includes a first water deflecting surface.

8. The vehicle window regulator lifter plate as set forth in claim 7, wherein the water deflecting structure includes a second protrusion that extends upward from an upper section of the edge surface defining a second water deflecting surface that slopes downwardly in a direction towards the first water deflecting surface.

9. A vehicle window regulator lifter plate comprising:

a window regulator engagement portion configured to be slidably mounted along a window regulator rail of a window regulator mechanism;

a window glass support portion configured to support a lower edge of a window panel, the window glass support portion including first and second window panel attachment members that are configured and arranged to engage the window panel at a pair of spaced apart locations; and a water deflecting structure configured and arranged relative to the window glass supporting portion to deflect water running down the window panel away from the window regulator rail, the water deflecting structure including a first water deflecting surface and a second water deflecting surface, the first water deflecting surface extending in a forward to aft direction from proximate the first window panel attachment member to proximate the second window panel attachment member, the second water deflecting surface being disposed between the first and second window panel attachment members and above the first water deflecting surface, the second water deflecting surface being configured to deflect water running down the window panel toward the first water deflecting surface.

10. The vehicle window regulator lifter plate as set forth in claim 9, wherein the second water deflecting surface slopes downwardly in a direction towards the first water deflecting surface.

11. A vehicle window regulator lifter plate comprising:

a window regulator engagement portion configured to be slidably mounted along a window regulator rail of a window regulator mechanism;

a window glass support portion configured to support a lower edge of a window panel; and a water deflecting structure configured and arranged relative to the window glass supporting portion to deflect water running down the window panel away from the window regulator rail, the water deflecting structure including a first water deflecting surface and a second water deflecting surface, the first water deflecting surface extending in a forward to aft direction that is transverse to movement of the window regulator rail along the window regulator engagement portion and second water deflecting surface that slopes downwardly in a direction towards the first water deflecting surface.

12. A vehicle door comprising:

a door body defining a window opening;

a window panel slidably supported in the door body;

a window regulator rail mounted to the door body; and a lifter plate slidably coupled to the window regulator rail for up and down sliding movement along the window regulator rail, the lifter plate having an outboard surface and an edge surface that surrounds the outboard surface, the lifter plate also including a window glass support portion supporting a lower edge of a window panel, and a water deflecting structure protruding upward from an upper section of the edge surface of the lifter plate defining a first water deflecting surface that extends in a direction corresponding to a length of the lower edge of the window panel, the first water deflecting surface of the water deflecting structure being positioned below the lower edge of the window panel configured and arranged to deflect water running down the window panel away from the window regulator rail.

13. The vehicle door as set forth in claim 12, wherein the water deflecting structure further comprises an elongated protrusion that extends from the outboard surface of the lifter plate that includes a second water deflecting surface configured to deflect water toward a front edge of the lifter plate and a rear edge of the lifter plate.

14. The vehicle door as set forth in claim 13, wherein the first water deflecting surface is configured to deflect water running down the window panel toward the second water deflecting surface.

15. The vehicle door as set forth in claim 12, wherein the first water deflecting surface is configured to deflect water running down the window panel toward the outboard surface of the lifter plate.

16. The vehicle door as set forth in claim 15, wherein the first water deflecting surface has an upper end disposed inboard of an outer lower edge of the window panel and a lower end disposed approximately outboard of the outer lower edge of the window panel.

17. The vehicle door as set forth in claim 15, wherein the water deflecting structure includes an elongated protrusion extending from the outboard surface of the lifter plate that together with an adjacent portion of the outboard surface defines a gutter that diverts water from the water deflecting surface toward at least one of a front edge of the lifter plate and a rear edge of the lifter plate.

18. The vehicle door as set forth in claim 12, wherein the water deflecting structure includes a protrusion that extends upward from the upper section of the edge surface defining the first water deflecting surface that slopes in a downward direction toward the outboard surface.

* * * * *